(12) United States Patent
Leustek et al.

(10) Patent No.: US 8,282,706 B2
(45) Date of Patent: Oct. 9, 2012

(54) ENGINE EXHAUST AFTER-TREATMENT SYSTEM

(75) Inventors: Matthew E. Leustek, Metamora, IL (US); Michael P. Withrow, Peoria, IL (US); Clayton D. Walenta, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 13/420,831

(22) Filed: Mar. 15, 2012

(65) Prior Publication Data

US 2012/0167556 A1 Jul. 5, 2012

Related U.S. Application Data

(63) Continuation of application No. 11/998,408, filed on Nov. 30, 2007, now Pat. No. 8,182,578.

(51) Int. Cl.
*B01D 46/46* (2006.01)
(52) U.S. Cl. ........ 95/26; 55/385.3; 55/523; 55/DIG. 30; 96/424; 60/277; 60/284
(58) Field of Classification Search ............ 55/522–524, 55/385.3, DIG. 30; 96/424; 60/276–303; 701/104, 115; 422/55–63; 95/26
See application file for complete search history.

(56) References Cited

U.S. PATENT DOCUMENTS

| | | | |
|---|---|---|---|
| 4,462,208 A | 7/1984 | Hicks et al. | |
| 4,477,771 A | 10/1984 | Nagy et al. | |
| 4,531,363 A | 7/1985 | Ludecke et al. | |
| 4,538,411 A | 9/1985 | Wade et al. | |
| 4,685,066 A * | 8/1987 | Hafele et al. ............ 702/50 |
| 4,786,295 A | 11/1988 | Newman et al. | |
| 5,157,340 A | 10/1992 | Walton et al. | |
| 5,319,930 A | 6/1994 | Shinzawa et al. | |
| 6,203,590 B1 | 3/2001 | Byrd et al. | |
| 6,454,834 B1 | 9/2002 | Livingstone et al. | |
| 7,157,919 B1 | 1/2007 | Walton | |
| 7,765,796 B2 | 8/2010 | Colignon | |
| 8,086,424 B2 * | 12/2011 | Farmer ..................... 702/184 |
| 8,146,376 B1 * | 4/2012 | Williams et al. .............. 62/157 |
| 2002/0078830 A1 | 6/2002 | Chung et al. | |
| 2003/0154710 A1 | 8/2003 | Plote et al. | |
| 2003/0233248 A1 * | 12/2003 | Shingu et al. ................ 705/1 |
| 2004/0031262 A1 | 2/2004 | Gui et al. | |
| 2005/0060974 A1 * | 3/2005 | Palmerton et al. ............ 55/482 |
| 2005/0160916 A1 * | 7/2005 | Rohrbach et al. ............ 96/424 |
| 2006/0005534 A1 | 1/2006 | Wirth et al. | |
| 2006/0191256 A1 | 8/2006 | Colignon | |
| 2006/0282213 A1 | 12/2006 | Withrow et al. | |

(Continued)

*Primary Examiner* — Duane Smith
*Assistant Examiner* — Amber Orlando
(74) *Attorney, Agent, or Firm* — Finnegan, Henderson, Farabow, Garrett & Dunner LLP

(57) ABSTRACT

An engine exhaust after-treatment system is provided, which may include a particulate trap configured to remove at least some constituents of the exhaust flowing from an engine through an exhaust system. The system may also include a controller configured to collect in-service data related to an operating parameter indicative of the amount of time the engine operates. In addition, the system may include a memory device attached to the particulate trap and including a memory. The memory may be configured to store usage data indicative of how much time the particulate trap has been used in service. The memory may be configured to communicate with the controller to receive information related to the in-service data collected by the controller and update the usage data in the memory, based on the communication with the controller, to reflect a total amount of time the particulate trap has been in service.

22 Claims, 2 Drawing Sheets

U.S. PATENT DOCUMENTS

| | | |
|---|---|---|
| 2007/0000241 A1 | 1/2007 | Funke et al. |
| 2007/0006577 A1 | 1/2007 | Yokoyama et al. |
| 2007/0022746 A1 | 2/2007 | Decou et al. |
| 2007/0024289 A1 | 2/2007 | Knitt et al. |
| 2007/0068147 A1 | 3/2007 | Sun et al. |
| 2007/0169469 A1 | 7/2007 | Knitt |
| 2007/0251214 A1 | 11/2007 | Nishino et al. |
| 2007/0251221 A1 | 11/2007 | Lueschow et al. |
| 2007/0289290 A1 | 12/2007 | Bartley et al. |
| 2008/0155965 A1 | 7/2008 | Henderson et al. |
| 2008/0202096 A1 | 8/2008 | Driscoll et al. |
| 2008/0224838 A1* | 9/2008 | Rains et al. .................. 340/438 |
| 2009/0288561 A1* | 11/2009 | Palmerton et al. .............. 96/417 |
| 2011/0072771 A1* | 3/2011 | Palmerton et al. ........... 55/385.1 |

* cited by examiner

ENGINE EXHAUST AFTER-TREATMENT SYSTEM

This is a continuation of application Ser. No. 11/998,408, filed Nov. 30, 2007 now U.S. Pat. No. 8,182,578 which is incorporated herein by reference.

TECHNICAL FIELD

The present disclosure is directed to an engine exhaust after-treatment system and, more particularly, an engine exhaust after-treatment system including a memory device configured to store usage data indicative of how much time the particulate trap has been used in service.

BACKGROUND

Engines, including diesel engines, gasoline engines, natural gas engines, and other engines known in the art, may exhaust a complex mixture of air pollutants. The air pollutants may include both gaseous and solid material, such as, for example, particulate matter. Particulate matter may include ash and unburned carbon particles and may sometimes be referred to as soot.

Due to, among other things, increased environmental concerns, exhaust emission standards have become more stringent. The amount of particulate matter and gaseous pollutants emitted from an engine may be regulated depending on the type, size, and/or class of engine. In order to meet these emissions standards, engine manufacturers have pursued improvements in several different types of engine technology, such as fuel injection, engine management, and air induction, to name a few. In addition, engine manufacturers have developed devices for treatment of engine exhaust after it leaves the engine. This area of technology may be referred to as after-treatment.

Engine manufacturers have employed exhaust treatment devices called particulate traps to remove the particulate matter from the exhaust flow of engines. Particulate traps may include a filter formed of a filter material designed to trap particulate matter. The use of a particulate trap for extended periods of time, however, may enable particulate matter (which includes soot and ash) to accumulate on the filter, thereby causing the filter to reduce in effective volume and resulting in a decline in engine performance.

One method of restoring the performance of a particulate trap may include regeneration. Regeneration of a particulate trap filter system may be accomplished by thermal regeneration, which may include increasing the temperature of the filter and the trapped particulate matter above the oxidation temperature of the particulate matter, thereby burning away soot collected in the trap.

This increase in temperature may be effectuated by various means. For example, some systems employ a heating element (e.g., an electric heating element) to directly heat one or more portions of the particulate trap (e.g., the filter material or the external housing). Other systems have been configured to heat the exhaust gases upstream from the particulate trap, allowing the flow of the heated gases through the particulate trap to transfer heat to the particulate trap. For example, some systems may alter one or more engine operating parameters, such as air/fuel mixture, to produce exhaust gases with an elevated temperature. Running an engine with a "rich" air/fuel mixture can elevate exhaust gas temperature. Other systems heat the exhaust gases upstream from the particulate trap, with the use of a burner that creates a flame within the exhaust conduit leading to the particulate trap.

Nevertheless, even with regular regeneration, particulate traps may periodically require service, wherein a cleaning process is used to remove accumulated ash. Because the process of servicing a particulate trap is not trivial and can take some time, the trap is often removed from the engine/vehicle for service and can be replaced with another trap to minimize downtime for the engine/vehicle.

The replacement traps are not necessarily new and are often previously used traps that have been serviced (i.e., cleaned). Particulate traps may lose some efficiency/performance over the course of their service life, such that, even after being serviced, the trap may not perform up to the same standard as when new.

Because of this degradation in performance, regulatory agencies may require proof, or at least evidence, that any replacement particulate trap installed on an engine/vehicle has not been in service for any longer than the engine to which it is being connected. That is to say that the regulatory agencies expect a certain amount of degradation in emissions performance of an engine and after-treatment system over time. Engines are "certified" by the regulatory agencies with the understanding that the performance will not degrade more than a predetermined amount. However, if a particulate trap that is older (in terms of service life) than engine on which it is installed, the overall emissions performance may become substantially less efficient at that stage of the engine system's life than was expected of a certified system.

Systems have been developed that monitor the service life of particulate traps. For example, U.S. Patent Application Publication No. 2006/0005534, issued to Wirth et al., discloses a particulate-filter service-life determination unit. The system of the '534 publication, however, does not disclose a device that is specific to each particulate trap, independent of the engine. Instead, the '534 publication discloses that the particulate-filter service-life determination unit is based on a system that measures exhaust parameters associated with the particulate trap, such as pressure drop across the filter. That is, the system measures pressure drop across any filter installed in the exhaust system. Consequently, there is nothing tied to the particulate trap to indicate how long the trap has been in service. Thus, if the trap is removed from the device, serviced, and then replaced, there is nothing to indicate how long it has been in service.

The present disclosure is directed at improvements in existing engine exhaust after-treatment systems.

SUMMARY

In one aspect, the present disclosure is directed to an engine exhaust after-treatment system. The system may include a particulate trap configured to remove at least some constituents of the exhaust flowing from an engine through an exhaust system. The system may also include a controller configured to collect in-service data related to an operating parameter indicative of the amount of time the engine operates. In addition, the system may include a memory device associated with the particulate trap and including a memory. The memory may be configured to store usage data indicative of how much time the particulate trap has been used in service. Further, the memory may be configured to communicate with the controller to receive information related to the in-service data collected by the controller and update the usage data in the memory, based on the communication with the controller, to reflect a total amount of time the particulate trap has been in service.

In another aspect, the present disclosure is directed to a method of recording the amount of time a particulate trap has been in service. The method may include collecting, with a controller, in-service data related to an operating parameter indicative of the amount of time an engine has been operated. The method may also include communicating information related to the in-service data collected by the controller from the controller to a memory device associated with a particulate trap configured to remove at least some constituents of an exhaust flow from an engine through an exhaust system. In addition, the method may include storing usage data on the memory device, based on the communication with the controller, wherein the usage data is indicative of how much time the particulate trap has been used in service.

In another aspect, the present disclosure is directed to a memory device. The memory device may include a memory. The memory may be configured to store usage data indicative of how much time a particulate trap has been used in service, the particulate trap being configured to remove at least some constituents of the exhaust flowing from an engine through an exhaust system. The memory may be further configured to communicate with a controller configured to collect in-service data related to an operating parameter indicative of the amount of time the engine operates in order to receive information related to the in-service data collected by the controller. In addition, the memory may be configured to update the usage data in the memory, based on the communication with the controller, to reflect a total amount of time the particulate trap has been in service.

DETAILED DESCRIPTION

Reference will now be made in detail to the drawings. Wherever possible, the same reference numbers will be used throughout the drawings to refer to the same or like parts.

Figure 1:
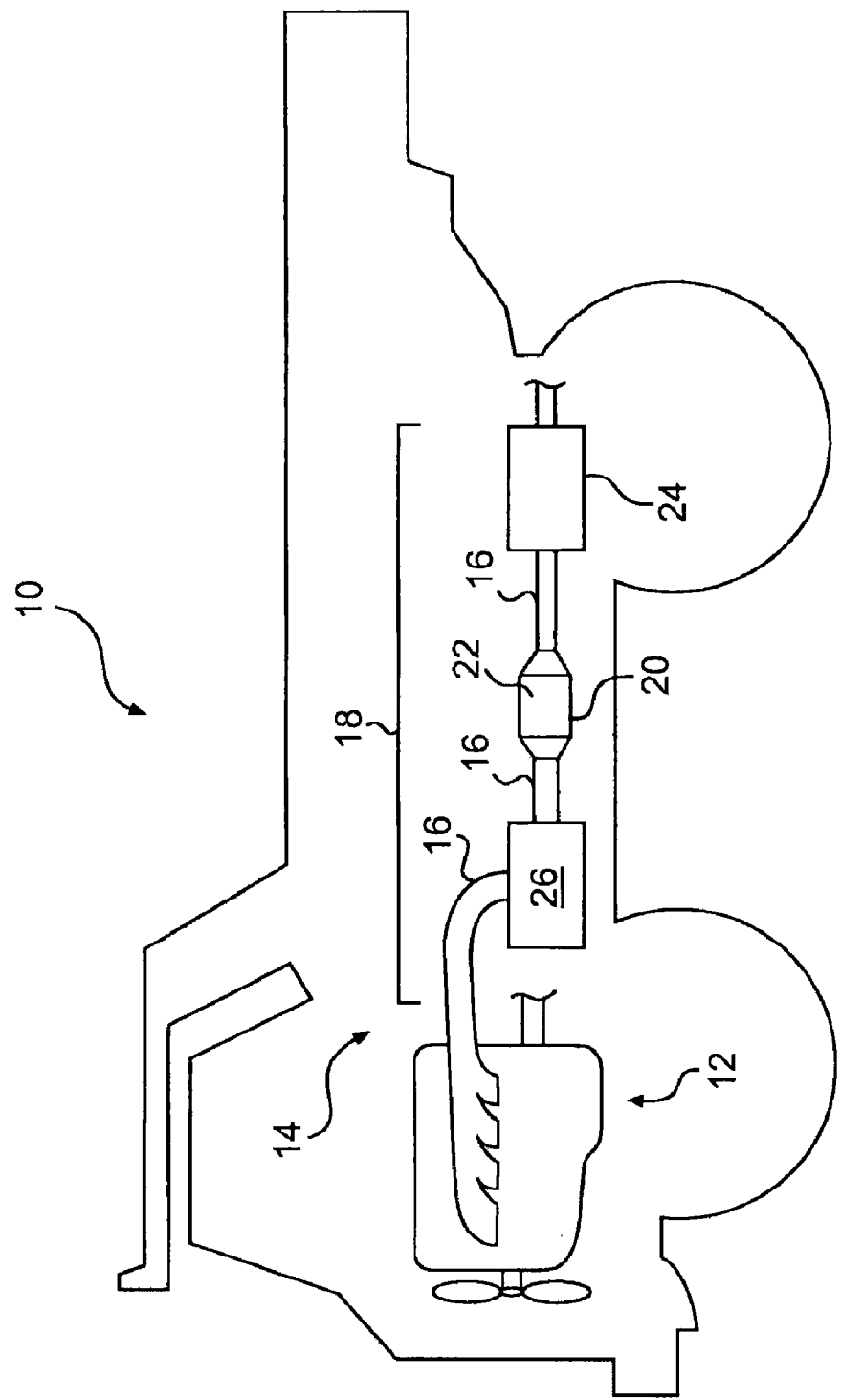
FIG. 1 is a diagrammatic illustration of a machine having an engine exhaust after-treatment system according to an exemplary disclosed embodiment.

FIG. 1 illustrates a machine 10. Machine 10 may include, an engine 12 and an exhaust system 14 configured to carry exhaust away from engine 12. Although machine 10 is shown as a truck, machine 10 could be any type of machine having an exhaust producing engine. Machine 10 may embody a fixed or mobile machine that performs some type of operation associated with an industry such as mining, construction, farming, transportation, or any other industry.

Examples of mobile versions of machine 10 may include vehicles, such as a road-going cars, trucks, and buses. Other such examples may include off-road vehicles, such as earth moving machines (e.g., excavators, dozers, loaders, backhoes, motor graders, dump trucks (as shown in FIG. 1), or any other earth moving machine).

Examples of fixed versions of machine 10 may include power generation sets (e.g., gas turbine engines paired with electric power generators). Such power generation sets may be employed, for example, on off-shore oil drilling rigs and ocean-going ships. In other embodiments, machine 10 may, itself, be an ocean-going ship, powered by engine 12.

Engine 12 may be any kind of engine that produces an exhaust flow of exhaust gases. For example, engine 12 may be an internal combustion engine, such as a gasoline engine, a diesel engine, a gaseous fuel burning engine (e.g., natural gas) or any other exhaust gas producing engine.

Exhaust system 14 may include an exhaust conduit 16 to which various components may be attached. For example, an engine exhaust after-treatment system 18 may be associated with exhaust system 14 and may be configured to treat the exhaust after the exhaust leaves engine 12.

After-treatment system 18 may include one or more after-treatment devices. For example, after-treatment system 18 may include a particulate trap 20, which may include a particulate filter material 22, and may be configured to remove at least some constituents of the exhaust flowing from engine 12 through exhaust system 14.

In addition, system 18 may also include a catalytic conversion unit 24. In some embodiments that are not shown, particulate trap 20 and catalytic conversion unit 24 may be combined. For example, particulate trap 20 and catalytic conversion unit 24 may be incorporated into a single unit in a common housing. Further, in some embodiments, particulate filter material 22 may be formed from, or coated with, a catalytic material.

Particulate trap 20 may be configured to be thermally regenerated. That is, regeneration of particulate trap 20 may be accomplished by increasing the temperature of particulate trap 20 above the combustion temperature of the particulate matter collected therein.

Such increases in temperature of particulate trap 20 may be generated in a number of different ways. For example, heat may be directly applied to particulate trap 20 via a heating device integral with or adjacent to particulate trap 20. An example of such a heating device may include an electric heating element (not shown). Alternatively or additionally, the temperature of particulate trap 20 may be increased by heat transferred to it from the exhaust gases flowing through it. In such embodiments, heat may be applied to exhaust gases upstream from particulate trap 20. The temperature of the exhaust gases may be increased in one or more ways. For example, altering engine parameters may have an effect on exhaust gas temperature. Exhaust temperature may also be raised by heating the exhaust gases or exhaust conduit 16. For example, an electric heating element and/or flame or plasma producing burner may be configured to heat the exhaust gases or exhaust conduit 16.

In some embodiments, after-treatment system 18 may include a regeneration device 26 configured to reduce an amount of particulate matter in particulate trap 20. For example, regeneration device 26 may include a burner assembly configured to increase the temperature of the exhaust gases flowing through exhaust conduit 16 upstream from particulate trap 20. Regeneration device 26 may be configured to maintain or restore the performance of particulate trap 20 through thermal regeneration. Regeneration device 26 may be configured to prevent or restore any decline in engine performance and avoid possible damage to particulate trap 20 by elevating the temperature of particulate trap 20, thus burning off particulate matter accumulated therein.

Figure 2:
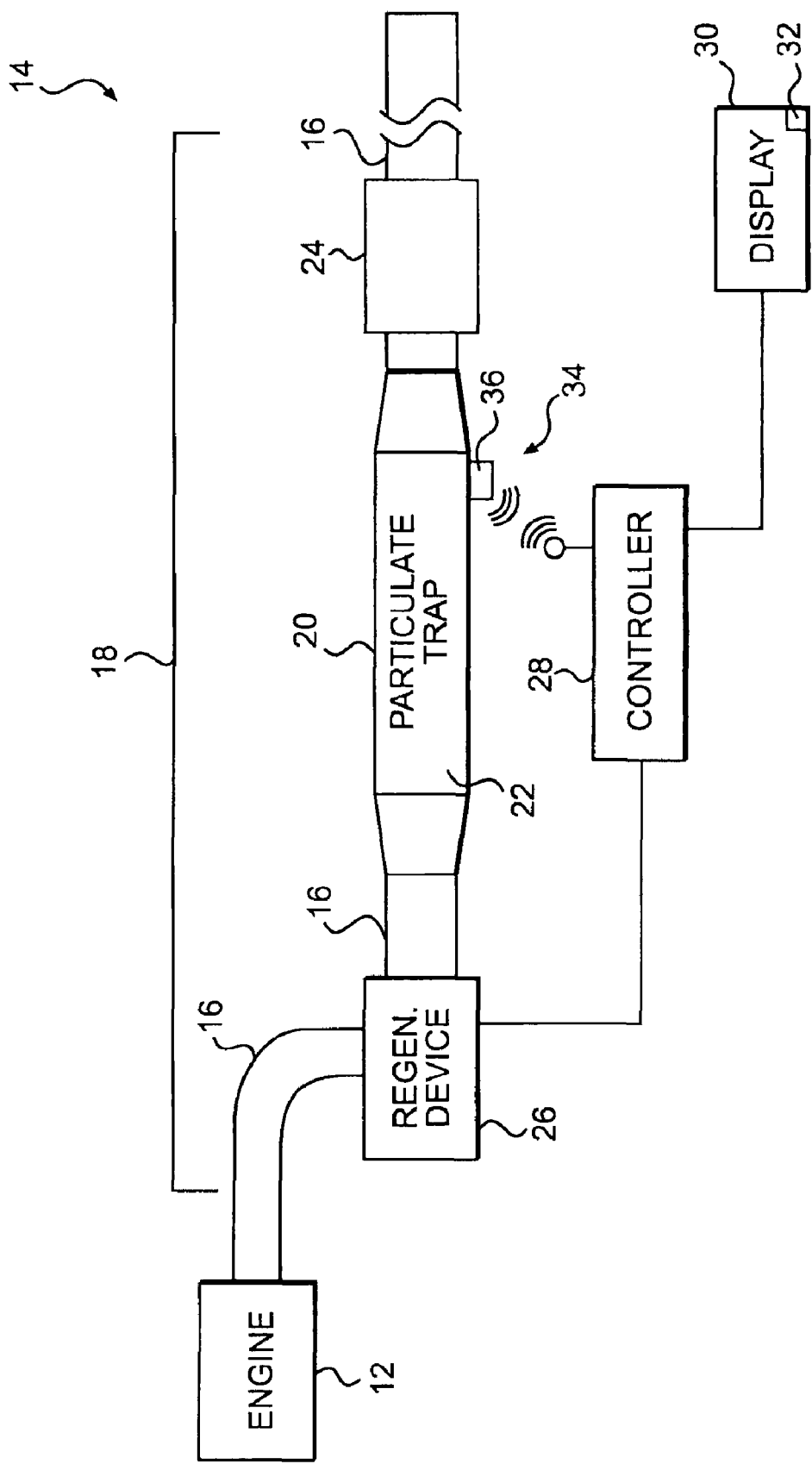
FIG. 2 is a block diagram representation of an exemplary engine and exhaust system including an exemplary disclosed after-treatment system.

FIG. 2 is a block diagram representation of machine 10 including after-treatment system 18. As shown in FIG. 2, after-treatment system 18 may also include a controller 28. Controller 28 may include any means for receiving information regarding machine operating parameters and/or for monitoring, recording, storing, indexing, processing, and/or communicating such information. These means may include components such as, for example, a memory, one or more data storage devices, a central processing unit, or any other components that may be used to run an application.

Although aspects of the present disclosure may be described generally as being stored in memory, one skilled in the art will appreciate that these aspects can be stored on, or read from, types of computer program products or computer-readable media, such as computer chips and secondary storage devices, including hard disks, floppy disks, optical media, CD-ROM, or other forms of RAM or ROM. Various other known circuits may be associated with controller 28, such as power supply circuitry, signal-conditioning circuitry, solenoid driver circuitry, communication circuitry, and other appropriate circuitry.

Controller 28 may perform multiple processing and controlling functions, such as, for example, engine management (e.g., controller 28 may include an engine control module, a.k.a. an ECM), monitoring of particulate loading, and controlling regeneration of particulate trap 20. For example, controller 28 may be configured to receive information from sensors configured to collect data regarding operating parameters that are indicative of the amount of particulate matter accumulated in particulate trap 20. Controller 28 may be configured to activate regeneration device 26 in response to a determination, based on the collected data, that the amount of material accumulated in particulate trap 20 exceeds a predetermined amount.

Controller 28 may be configured to collect in-service data related to an operating parameter indicative of the amount of time engine 12 operates. In some embodiments, the operating parameter may include, for example, distance traveled by a vehicle (e.g., machine 10) powered by engine 12. In other embodiments, the operating parameter may include, for example, the actual operating time of the engine.

In some embodiments, distance traveled may be used as a parameter for vehicles traveling substantial distances, e.g., road-going vehicles, such as passenger cars, hauling vehicles, etc. For these applications of engines, the distance traveled by such vehicles may be indicative of the amount of time engine 12 operates. More specifically, distance traveled may be indicative of the amount of time engine 12 operates under load, since on-road vehicles rarely put stress on their engines while stationary.

In contrast, stationary machines (e.g., gas turbine powered generator sets), or site construction machines (e.g., bulldozers, loaders, etc.) routinely tax their engines without traveling very far. Accordingly, for such machines, the operating parameter for which in-service data may be collected may include the actual operating time of engine 12. This parameter may sometimes be referred to as "engine hours" or "operating hours."

System 18 may include a display 30. Display 30 may be located at any suitable location on machine 10, such as, for example, at an operator station (e.g., on a dashboard). Display 30 may be any kind of display, including screen displays, such as, for example, cathode ray tubes (CRTs), liquid crystal displays (LCDs), plasma screens, and the like.

Display 30 may be configured to display information about operating parameters of system 18. For example, display 30 may include a warning indicator 32 (e.g., a warning lamp, warning message, etc.). Controller 28 may be configured to illuminate warning indicator 32 upon detection of the predetermined amount of faults. As an alternative or in addition to display 30, system 16 may include one or more audible alerts for conveying information about operating parameters of system 16 to an operator.

In addition to providing visual feedback regarding operating parameters of system 18, display 30 may also be configured to display other information regarding system 18 or any other device and/or system associated with work machine 10. For example, display 30 may also be configured to indicate when a regeneration event is occurring or about to occur.

After-treatment system 18 may include a memory device 34 associated with particulate trap 20. In some embodiments, the memory device may be fixed, or otherwise attached, to particulate trap 20 in any suitable way (e.g., bolts, screws, adhesive, welding, etc.). Memory device 34 may include a memory 36 configured to store usage data indicative of how much time particulate trap 20 has been used in service. Memory 36 may be further configured to communicate with controller 28 to receive information related to the in-service data collected by controller 28. In some embodiments, memory 36 and controller 28 may be configured to communicate via a wireless network (e.g., with radio frequency transmission). Alternatively, memory device 34 may be connectable to controller 28 with an appropriate, removable wire connector.

In some embodiments memory device 34 and controller 28 may communicate via an industry standard communication network, such as, for example, Controller Area Network (a.k.a., CAN or SAE J1939), Local Interconnect Network (LIN), or FlexRay. Also, in some embodiments, memory 36 may be flashable.

In addition, memory 36 may be configured to update the usage data in memory 36, based on the communication with controller 28, to reflect a total amount of time particulate trap 20 has been in service. In some embodiments, the information received by memory device 34 may include the in-service data collected by controller 28.

In some embodiments, communication of information from controller 28 to memory device 34 may be performed continually, in real-time. For purposes of this disclosure, the term "real-time" shall refer to the immediate or substantially immediate availability of data, e.g., as engine operation time elapses and/or as the distance traveled incrementally climbs. That is, in-service data may be available for consideration, with respect to the communication between memory device 34 and controller 28, as quickly as the data can be collected by controller 28. Such availability may be virtually instantaneous or may take a few seconds or minutes to complete. In such embodiments, memory device 34 may include an incremental time counter that counts as long as the engine to which it is attached is running. For example, in one embodiment, memory device 34 may continue to increment the counter as long as the engine rpm data in controller 28 is above a predetermined amount (e.g., several hundred rpm below idle).

In other embodiments, the communication of information from controller 28 to memory device 34 may be performed periodically, at a predetermined time interval. For example, for every hour of engine operation recorded by controller 28, controller 28 may communicate with memory device 34 to update the data log therein.

In still other embodiments, the communication of information from controller 28 to memory device 34 may be performed upon shutdown of engine 12. In such embodiments, upon shutdown, the length of time the engine was operated since it was last turned on may be communicated to memory device 34, or otherwise influence the incremental increase in in-service hours stored in memory device 34.

In some embodiments, controller 28 may be further configured to retrieve information from memory device 34 to determine the total amount of time particulate trap 20 has been in service. Controller 28 may be configured to generate a fault if the total amount of time the particulate trap has been in service exceeds the total amount of time the engine has been operated. Controller 28 may also be configured to prevent operation of engine 12 if a fault is generated. In addition, controller 28 may be configured to display an alert and/or information about such a fault using display 30, e.g., with warning indicator 32. In some embodiments, comparisons between total in-service time of engine 12 and total in-service time stored in memory 36 on particulate trap 20 may be made continually, e.g., in real time. In other embodiments, the comparisons may be made periodically. Periodic comparisons may be made on demand (i.e., by a user) in some embodiments.

In addition, these comparisons may be used to confirm that the time counters in memory device 34 and controller 28 do not become slightly out of synch. If the counts become moderately divergent, system 10 may be configured to correct, i.e., synchronize, the counts in the two components.

In addition to the data handling capabilities described above, memory device 34 may also be configured to withstand elevated temperatures experienced by particulate trap 20. Besides the high temperatures of exhaust gases produced by engine 12, particulate trap 20 may also be subjected to even higher temperatures during thermal regeneration processes, as described above. Memory device 34 and other data handling hardware associated with memory device 34 may be insulated or otherwise configured to withstand these temperatures.

INDUSTRIAL APPLICABILITY

The disclosed after-treatment system may be applicable to any application of an exhaust producing engine. The disclosed system may facilitate monitoring and ensuring that replacement after-treatment system componentry performs on par with the remainder of the after-treatment system. In some embodiments, the disclosed system may ensure that after-treatment devices, such as particulate traps, are no older, in terms of a total amount of use, than the engine to which the after-treatment system is attached.

Further, while system 10 and memory device 34 are discussed above with respect to use for monitoring the service life of particulate traps, memory device 34 and system 10 may also be used to monitor the service life of any after-treatment component. For example, system 10 may also be used to monitor service life of catalyst-based devices, such as Selective Catalytic Reduction (SCR) catalysts, Diesel Oxidation Catalysts (DOC), etc.

An exemplary method of using the disclosed system is discussed below. The following is a discussion of an exemplary method of recording the amount of time a particulate trap has been in service.

The method may include collecting, with a controller, in-service data related to an operating parameter indicative of the amount of time an engine has been operated. The method may also include communicating information related to the in-service data collected by the controller from the controller to a memory device associated with a particulate trap configured to remove at least some constituents of an exhaust flow from an engine through an exhaust system. In addition, the method may include storing usage data on the memory device, based on the communication with the controller, wherein the usage data is indicative of how much time the particulate trap has been used in service.

In some embodiments, the communication of information from the controller to the memory device may be performed continually, in real-time. In other embodiments, the communication of information from the controller to the memory device may be performed periodically, at a predetermined time interval. Alternatively, the communication of information from the controller to the memory device may be performed upon shutdown of the engine. In such an embodiment, the length of time the engine was operated since it was last turned on may be communicated to the memory device.

The exemplary method may further include retrieving information with the controller from the memory device to determine the total amount of time the particulate trap has been in service and generating a fault with the controller if the total amount of time the particulate trap has been in service exceeds the total amount of time the engine has been operated. In addition, the method may include preventing operation of the engine if the fault is generated.

It will be apparent to those having ordinary skill in the art that various modifications and variations can be made to the disclosed engine exhaust after-treatment system without departing from the scope of the invention. Other embodiments of the invention will be apparent to those having ordinary skill in the art from consideration of the specification and practice of the invention disclosed herein. It is intended that the specification and examples be considered as exemplary only, with a true scope of the invention being indicated by the following claims and their equivalents.

What is claimed is:

1. An engine exhaust after-treatment system comprising:
an engine configured to produce an exhaust;
a particulate trap connected to the engine to direct the exhaust therethrough, the particulate trap including a memory device configured to store data indicative of particulate trap service life, the particulate trap service life being a total length of time the particulate trap has been used in service connected to any engine; and
a controller operably coupled to the engine, the controller being configured to:
store data indicative of engine service life, the engine service life being a total length of time the engine has been used in service; and
identify, based on the particulate trap service life and the engine service life, whether the particulate trap has been used in service for a longer time than the engine to which the particulate trap is coupled.

2. The system of claim 1, wherein the memory device is operably coupled to the particulate trap.

3. The system of claim 2, wherein the memory device is fixed to the particulate trap.

4. The system of claim 1, wherein the memory device is configured to communicate with the controller and update the particulate trap service life stored in the memory device based on an increase in the engine service life.

5. The system of claim 4, wherein the memory device is configured to communicate wirelessly with the controller.

6. The system of claim 4, wherein the memory device is configured to communicate with the controller through a wired connection.

7. The system of claim 1, wherein the controller is configured to display an alert if the particulate trap has been used in service for a longer time than the engine to which the particulate trap is coupled.

8. The system of claim 1, wherein the controller is configured to prevent operation of the engine if the particulate trap has been used in service for a longer time than the engine to which the particulate trap is coupled.

9. The system of claim 1, wherein the particulate trap service life stored in the memory device includes a length of time the particulate trap has been used in service in an engine different from the engine to which the particulate trap is coupled.

10. The system of claim 9, wherein the particulate trap service life additionally includes identifying a length of time the particulate trap has been used in service in the engine to which the particulate trap is coupled.

11. A particulate trap configured to filter exhaust from an engine, the particulate trap comprising: a memory device fixed to the particulate trap, the memory device being configured to store data indicative of particulate trap service life, the particulate trap service life being a total amount of time the particulate trap has been previously used in service, wherein the data stored in the memory device includes a length of time the particulate trap has been used in service in an engine different from the engine that the particulate trap is installed on.

12. The particulate trap of claim 11, wherein the memory device is configured to communicate with a controller of an engine that the particulate trap is installed on to update the data stored in the memory device.

13. The particulate trap of claim 12, wherein the memory device is configured to communicate with the controller wirelessly.

14. A method of detecting if a particulate trap installed in an engine has been used in service for a longer time than the engine has been used in service, the method comprising:
   storing data indicative of particulate trap service life in a memory device associated with the particulate trap, the particulate trap service life including an amount of time the particulate trap has been used in service prior to installation in the engine;
   recording data indicative of engine service life in a controller of the engine, the engine service life being indicative of an amount of time the engine has been used in service; and
   detecting, based on the stored data indicative of particulate trap service life and the recorded data indicative of engine service life, if the particulate trap installed in the engine has been used in service for a longer time than the engine has been used in service.

15. The method of claim 14, wherein the storing includes updating the stored data indicative of particulate trap service life using the recorded data indicative of the engine service life.

16. The method of claim 15, wherein the updating includes communicating the recorded data indicative of engine service life to the memory device associated with the particulate trap.

17. The method of claim 16, wherein the communicating includes transmitting the data indicative of engine service life wirelessly to the memory device.

18. The method of claim 14, further including preventing operation of the engine if the particulate trap installed in the engine has been used in service for a longer time than the engine has been used in service.

19. The method of claim 14, further including displaying an alert if the particulate trap installed in the engine has been used in service for a longer time than the engine has been used in service.

20. A memory device configured to be used in an exhaust system of an engine including a particulate trap, comprising:
   a memory configured to store data indicative of a total length of time the particulate trap has been used in service prior to installation in the engine, and communicate with a controller of the engine to update the data stored in the memory device.

21. The memory device of claim 20, wherein the memory is configured to store data indicative of a length of time the particulate trap has been used in service in an engine different from the engine that the particulate trap is installed on.

22. The memory device of claim 20, wherein the memory device is configured to be physically attached to the particulate trap.

* * * * *